United States Patent
Quach

(10) Patent No.: US 6,711,712 B2
(45) Date of Patent: Mar. 23, 2004

(54) METHOD AND APPARATUS FOR ERROR DETECTION/CORRECTION

(75) Inventor: Nhon T. Quach, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 511 days.

(21) Appl. No.: 09/746,046

(22) Filed: Dec. 21, 2000

(65) Prior Publication Data

US 2002/0082795 A1 Jun. 27, 2002

(51) Int. Cl.[7] ................................................ G06F 11/10
(52) U.S. Cl. ...................................................... 714/819
(58) Field of Search ........................... 714/49, 56, 746, 714/773, 819

(56) References Cited

U.S. PATENT DOCUMENTS

| | | | | |
|---|---|---|---|---|
| 4,224,680 A | * | 9/1980 | Miura | 708/531 |
| 4,291,407 A | * | 9/1981 | Armstrong | 714/803 |
| 5,043,990 A | * | 8/1991 | Doi et al. | 714/820 |
| 6,021,511 A | * | 2/2000 | Nakano | 714/48 |

* cited by examiner

Primary Examiner—Stephen M. Baker
(74) Attorney, Agent, or Firm—Blakely, Sokoloff, Taylor & Zafman LLP

(57) ABSTRACT

A method of detecting errors in a datapath in accordance with the invention includes generating a plurality of electronic signals, computing a first at least one data-signature value based, at least in part, on the plurality of electronic signals and staging the plurality of electronic signals and the first at least one data-signature value. The method further includes transmitting the plurality of electronic signals via at least one intervening stage of circuitry, computing a second at least one data-signature value based, at least in part, on the plurality of electronic signals, and comparing the first at least one data-signature value the said second at least one data-signature value.

18 Claims, 3 Drawing Sheets

METHOD AND APPARATUS FOR ERROR DETECTION/CORRECTION

BACKGROUND

1. Field

This disclosure relates to error detection in electronic circuits, and, more particularly, to error detection in integrated microelectronic circuits.

2. Background Information

As is well-known, digital electronic circuitry may experience certain types of data errors. Among these types of errors, one particular type is soft-errors. Soft-errors are typically the results of external random events, such as radiation due to alpha particles or cosmic neutrons, for example, though other sources may exist. Such soft-error sources are well-known to those of skill in the art. In this regard, these external random events may cause a digital logic value to switch from its intended value, e.g. from logic '1' to logic '0'. As is also well-known, soft-errors are typically transient in nature. More particularly, after the effects of a soft-error are corrected, digital electronic components will typically function as expected.

Typical approaches that are employed to detect/correct such errors include parity and error checking and correction (ECC), both of which are well-known to those of skill in the art. Such approaches are, for example, commonly employed in memory array circuits, such as static random access memory (SRAM). Such memory arrays may be included, for example, in cache memory components, which may, in turn, be employed in a variety of computing platforms. Because such memory arrays, when embodied on, for example, an integrated circuit, have repeating physical patterns or layout, such techniques typically have little area impact on such circuits because parity or ECC circuitry may be efficiently incorporated as part of such repeating patterns. Likewise, such techniques typically have little adverse performance impact on such memory components, as the time to access digital electronic signals stored in such memory arrays is typically not significantly affected by such circuitry.

In contrast, because, at a minimum, datapath circuitry typically comprises layouts that are less compact, or dense, than, for example, memory arrays, current approaches to employing such parity or ECC techniques may be difficult to implement in datapath circuitry and may, for example, result in undesirable area impacts to such circuits. These area impacts may be due, at least in part, to the fact that parity or ECC circuitry may not be efficiently incorporated, as in memory arrays, for example. Likewise, because datapath circuitry is typically performance limiting to many circuits, current approaches employing parity and ECC in datapaths typically result in undesirable adverse effects on the performance of such circuits. Therefore, based on the foregoing, alternative error detection/correction schemes for datapath circuitry may be desirable.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

As was previously discussed, soft-errors may corrupt electronic information in electronic circuits, such as, for example, microelectronic circuits. Such errors, if not addressed, may result in adverse effects on the function of, for example, a computing system in which such circuits may be employed. Such effects may include, for example improper calculations or propagation of incorrect information. While such errors, as was previously discussed, are typically transient in nature, using such corrupted information may result in improper function of such circuitry, which is undesirable. As was also previously discussed, typical techniques for detecting and addressing such errors may include employing parity checking circuitry or error checking and correction (ECC) circuitry. Both of these techniques are well known to those of skill in the art. The invention is, of course, not limited in scope to any particular technique for implementing parity or ECC circuitry or even to any particular technique for detecting/correcting such errors.

Figure 1:
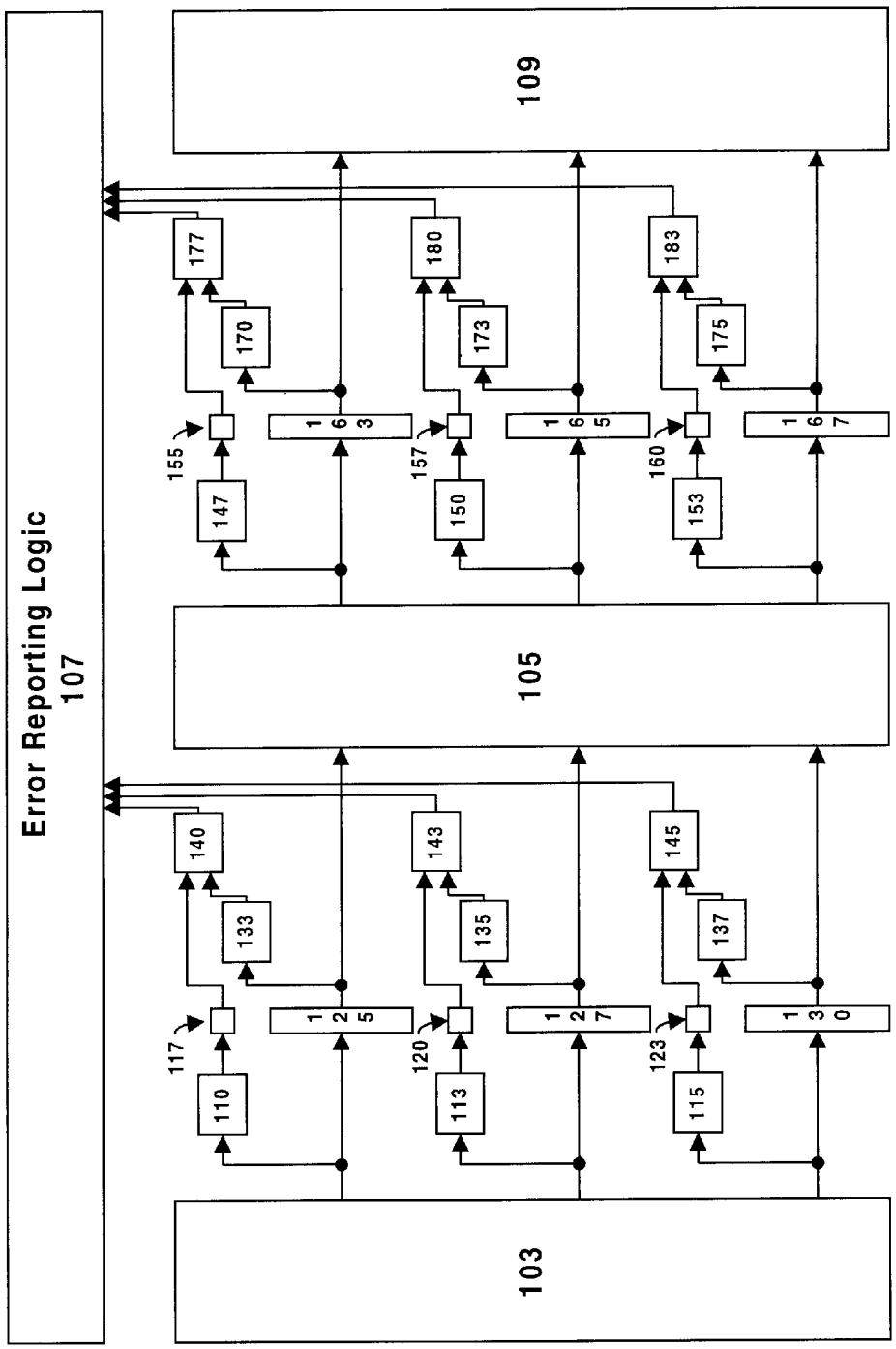
FIG. 1 is a block diagram illustrating a current embodiment of an error detection scheme.

As was previously indicated, current approaches to employing either parity or ECC schemes in datapath circuitry may have certain disadvantages. Such a current scheme is illustrated in FIG. 1. FIG. 1 is a block diagram illustrating a current data path circuit that may employ either parity or ECC techniques, for example. This embodiment comprises logic circuit stages 103, 105 and 109; staging latches 125, 127, 130, 163, 165 and 167; data-signature computation circuits 110, 113, 115, 133, 135, 137, 147, 150, 153, 170, 173 and 175; data-signature latches 117, 120, 123, 155, 157 and 160; data-signature comparison circuits 140, 143, 145, 177, 180 and 183 and error-reporting logic 107. For such an embodiment, either parity or ECC circuitry may be employed to generate and compare data-signatures, though the invention is not limited in scope in this respect. In this regard, for this embodiment, the data-signature latches, depending on the particular embodiment, may be capable of storing either a parity bit or a plurality of bits associated with an ECC value, as those of skill in the art would understand.

For this embodiment, electronic signals may be generated or "produced" by logic circuit stage 103. These signals may then be transmitted to staging latches 125, 127 and 130 as well as data-signature computation circuits 110, 113 and 115. A parity bit or ECC value, for example, may be computed by such circuits and then transmitted, respectively, to data-signature latches 117, 120 and 123. As is well-known, such electronic signals and data-signatures may be "clocked" into the staging latches and data-signature latches at substantially the same time by a clock signal (not shown). Such clocking techniques are well known to those of skill in the art and the invention is not limited in scope to any particular clocking technique or even to the use of a clock signal at all.

For this embodiment, when the electronic signals "latched" in staging latches 125, 127 and 130 are transmitted to logic circuit stage 105, the associated data-signatures may be recalculated by data-signature computation circuits 133, 135 and 137. Data-signature values latched in data-signature latches 117, 120 and 123 may then be compared to these recalculated values. Results of this comparison may, in turn, be "reported" to error-reporting logic 107. While the invention is not limited in scope to any particular error-reporting logic scheme or technique for "reporting" the results of such comparisons, error logic 107 may receive one or more electronic messages from data-signature comparison circuits 140, 143 and 145 when the values being compared do not match. In response to such an electronic message, error-reporting logic 107 may respond, for example, by signaling a user that an error has occurred, initiate a restart of a computing system in which such circuitry is employed, or any number of other responses for addressing such errors, which may be based, at least in part, on the particular embodiment. For this embodiment, the electronic signals may, in turn, be transmitted to staging latches 147, 150 and 153; and data-signature computation circuits 147, 150 and 153 via logic circuit stage 105. In this respect, the elements in FIG. 1 coupled between logic circuit stages 105 and 109 may operate in a substantially similar manner as described by the foregoing.

As was previously indicated, such embodiments of a datapath circuit may have certain disadvantages. For example, because data-signatures are computed twice and compared for each staging latch or datapath stage, circuitry for performing such functions may consume more area and power than desirable. In this regard, for embodiments employed in a microelectronic circuit, die area may be consumed by such circuitry, which may, in turn, result in an undesired increase in product costs. Additionally, power consumption due, at least in part, to such circuitry may be higher than embodiments not employing such circuitry. Another disadvantage of such an approach may be due, at least in part, to the time employed to compute a data-signature. As is well-known to those of skill in the art, the time employed to compute, for example, a parity bit/ECC value is typically longer than, for example, the time employed to transmit electronic signals from logic circuit stage 103 to staging latch 125. In this respect, the time to compute a parity bit/ECC value multiple times may adversely impact, for example, the time employed to transmit such signals from logic circuitry stage 103 to logic circuitry stage 105. This impact may, in turn, adversely affect the performance of, for example, a processor or memory sub-system employing such an embodiment. Therefore, based on the foregoing, alternative error detection and correction schemes may be desirable.

Figure 2:
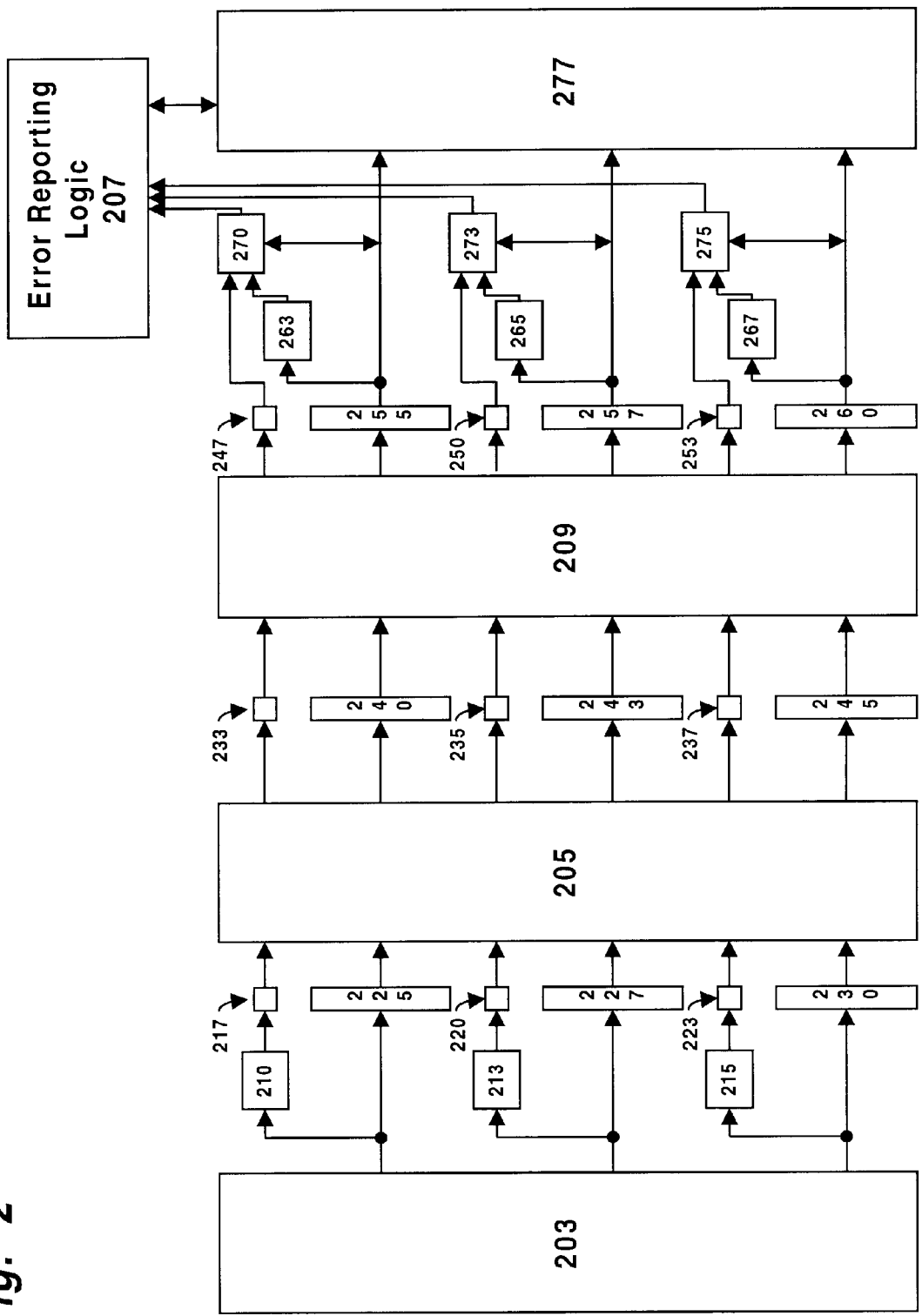
FIG. 2 is a block diagram illustrating an embodiment of an error detection scheme in accordance with the invention.

FIG. 2 illustrates a block diagram of a datapath circuit in accordance with the invention that may address at least some of the previously discussed disadvantages of current embodiments. This embodiment comprises logic circuit stages 203, 205, 209 and 277; staging latches 225, 227, 230, 240, 243, 245, 255, 257 and 260; data-signature computation circuits 210, 213, 215, 263, 265 and 267; data-signature latches 217, 220, 223, 233, 235, 237, 247, 250 and 253; data-signature comparison circuits 270, 273 and 275; and error-reporting logic 207. As in prior embodiments, parity or ECC may be employed in embodiments in accordance with the invention such as the embodiment illustrated in FIG. 1. In this respect, as was previously indicated, the data-signature latches, depending on the particular embodiment, may be capable of storing either a parity bit or an ECC value, though, of course, the invention is not limited in scope to employing parity or ECC schemes and other techniques for error correction and/or detection may exist.

For this particular embodiment, electronic signals may be "produced" by logic circuit stage 203. These signals may then be transmitted to staging latches 225, 227 and 230; and to data-signature computation circuits 210, 213 and 215. Once data-signatures are computed, these data-signatures may be transmitted to data-signature latches 217, 220 and 223. As was previously discussed, the electronic signals and the associated data-signatures may be "clocked" into the respective staging latches and data-signature latches, though the invention is not limited in scope in this respect. The electronic signals and the associated data-signatures may then be transmitted, respectively, to staging latches 240, 243 and 245; and data-signature latches 233, 235 and 237 via logic circuit stage 205. The combination of these staging latches, data-signature latches and logic circuit stage may be termed an intervening stage of circuitry for this particular embodiment. Likewise for this particular embodiment the electronic signals and data-signatures may be transmitted, respectively to staging latches 255, 257 and 260; and data-signature latches 247, 250 and 253 via logic circuit stage 209. Here, these staging latches, data-signature latches and logic circuit stage may also be termed an intervening stage of circuitry for this embodiment. The invention is, of course, not limited in scope to this particular configuration and many alternatives exist. For example, additional or fewer stages of intervening circuitry may be employed, portions of logic stages 205 and 209 may comprise "consuming" logic, as discussed hereafter, and, likewise, portions of logic stages 205 and 209 may comprise "producing" logic, which may produce electronic signals, as was discussed with respect to logic circuit stage 203. In this respect, data-signatures may be computed once electronic signals are produced and recomputed and compared prior to electronic signals being consumed.

In this particular embodiment, logic circuit stage 277 may be termed a "consuming" logic stage, which in this context means logic circuit stage 277 may modify or alter the electronic signals transmitted to it by staging latches 255, 257 and 260. In this respect, the intervening logic stages for this particular embodiment may be termed pipelining or pipelined circuitry. Pipelined circuitry, in this context, may be defined as circuitry that transmits data/electronic signals without modifying or altering the data. Typically, for such an embodiment, data-signatures would be recalculated and compared prior to transmitting such electronic signals to "consuming" circuitry. In this respect, data-signature computation circuits 263, 265 and 267 may be employed in this fashion to recalculate data-signatures for the electronic signals transmitted to staging latches 255, 257 and 260. For this embodiment, data-signature comparison circuits may then compare the data-signatures transmitted to data-signature latches 247, 250 and 253 with the results from data-signature computation circuits 263, 265 and 267. As was previously discussed with regard to FIG. 1, any mismatch in these parity bits or ECC values detected by 270, 273 or 275 may be reported by such comparison logic to error-reporting logic 207. The electronic signals may be transmitted from staging latches 255, 257 and 260 to logic circuit stage 277, where they may be "consumed."

For certain embodiments, such as those employing ECC, error-reporting logic 207 may be coupled with logic circuit stage 277 to, for example, correct any single bit errors detected in the electronic signals. The invention is, of course, not limited in scope in this respect and alternative methods of addressing such errors may exist. Alternatively, for example, data-signature comparison circuits 270, 273 and 275 may comprise circuitry to correct such errors and may be coupled with the staging latches to enable such correction. Additionally, for example, parity may be employed and error-reporting logic may signal that an error has occurred or initiate a restart of, for example, a computing system in which such an embodiment may be employed. Additionally, error-reporting logic 207 may initiate substantially similar actions as when parity is employed for embodiments employing ECC when one or more double bit errors are detected. In this respect, such an ECC scheme may be termed single-bit correction, double-bit detection. Such techniques are well-known to those of skill in the art, however, the invention is, of course, not limited in scope to any particular technique or approach for addressing such errors.

As was previously indicated, the embodiment illustrated in FIG. 1 may address some of the disadvantages of prior embodiments. In this respect, because data-signatures are only computed in response to electronic signals being "produced" by, for example, logic circuit stage 203 and then recomputed, and compared prior to "consumption" by, for example, logic circuit stage 277, such embodiments may employ less circuitry than prior approaches. In this regard, prior approaches compute and compare data-signatures at each circuitry stage. In this respect, depending on the particular embodiment, embodiments of datapaths in accordance with the invention may consume less area when embodied in a microelectronic circuit and also consume less power, as less circuitry would be employed, both of which are desirable.

Additionally, because data-signatures are typically not computed and compared at intervening circuit stages, such an embodiment may reduce the previously discussed performance impact associated with such computations and comparisons. In this respect, for example, a computing system employing such an embodiment may realize performance improvements as compared to a computing system employing a prior embodiment, such as illustrated in FIG. 1. Such an improvement may be due, at least in part, to embodiments in accordance with the invention not employing the time to compute and compare data-signatures at each stage of circuitry. Additionally, error-reporting logic 207 may be simplified, as fewer comparisons of data-signatures would be reported to such a circuit. Any improvements to an error-reporting logic, such as 207, may depend, at least in part, on the particular error detection/correction scheme employed and the invention is, of course, not limited in scope to any particular scheme or technique.

Figure 3:
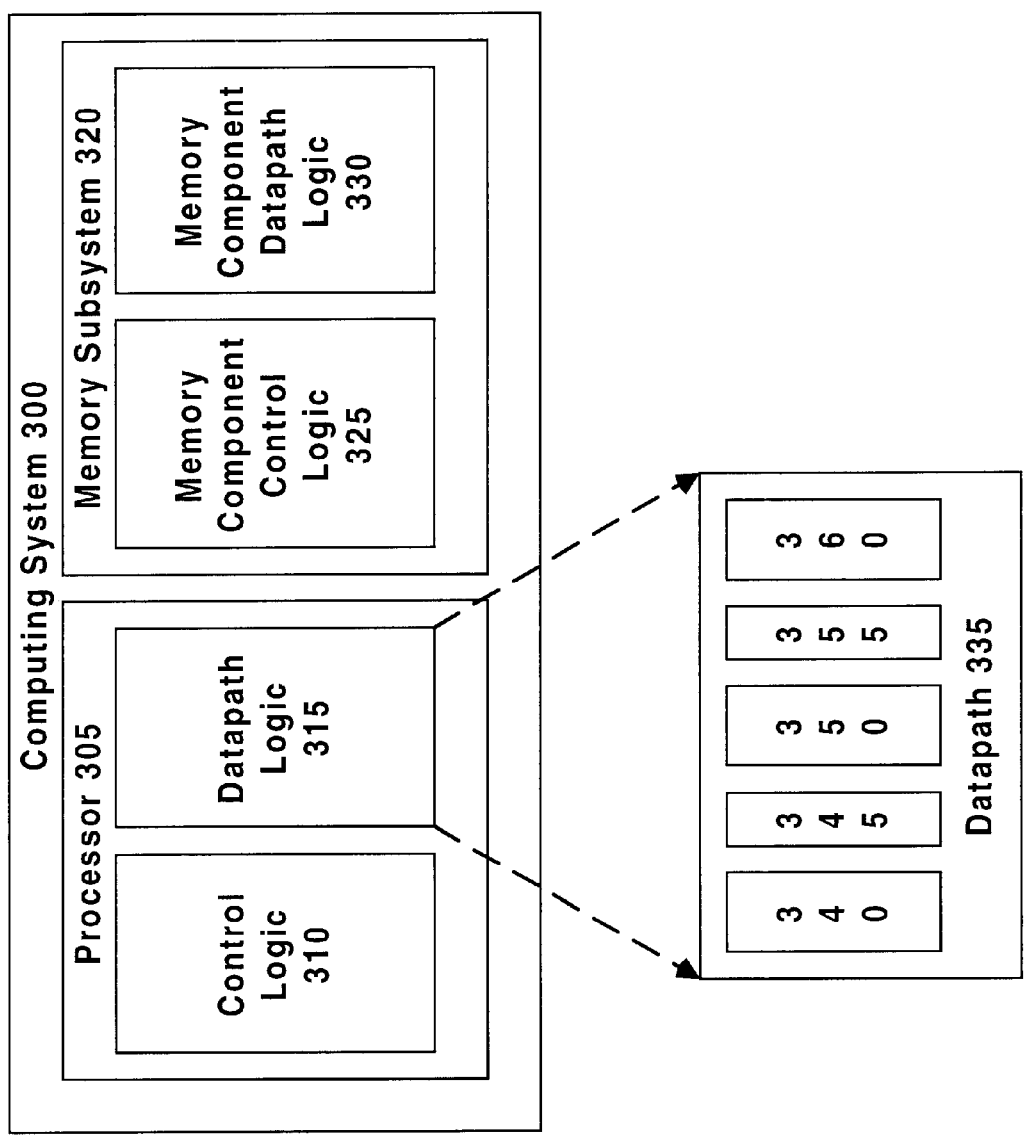
FIG. 3 is a block diagram illustrating an embodiment of a computing system in accordance with the invention.

FIG. 3 illustrates an embodiment of a computing system, 300, in accordance with the invention. This particular embodiment comprises a processor, 305, such as, for example a microprocessor and a memory subsystem, 320. Processor 305 further comprises control logic 310 and datapath logic 315 and memory subsystem 320 further comprises memory component control logic 325 and memory component datapath logic 330. In this respect, datapath logic 315 and memory component datapath logic 330 may comprise datapaths in accordance with the invention, such as datapath 335. For this particular embodiment, datapath 335 may comprise a logic circuit stage 340, capable of "producing electronic signals; latch stage 345; intervening circuit stage 350, latch stage 355; and logic circuit stage 360, capable of "consuming" the electronic signals "produced" by logic circuit stage 340. For this particular embodiment latch stage 345 may comprise staging latches, data-signature latches and a data-signature computation circuit. Likewise, latch stage 355 may comprise staging latches, data-signature latches, a data-signature computation circuit and a data-signature comparison circuit. While the invention is not limited in scope to any particular data path configuration, for this particular embodiment, datapath 335 may function in substantially a similar manner as the datapath illustrated in FIG. 2. Of course, many alternative datapaths in accordance with the invention may exist, as was previously discussed.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A circuit comprising:
 a first stage of logic circuitry capable of producing electronic signals coupled with at least one staging latch and a first circuitry for generating a first at least one data-signature;
 at least one data-signature latch, associated with respective staging latches of said at least one staging latch, coupled with said circuitry for generating a first at least one data-signature such that said first at least one data-signature is stored as electronic signals in said at least one data-signature latch; and
 at least one intervening stage of circuitry coupled with said at least one staging latch, said at least one data-signature latch, and a second circuitry for generating a second at least one data-signature, wherein said second circuitry for generating a second at least one data-signature is further coupled with circuitry for comparing said second at least one data-signature with said first at least one data-signature, and wherein said first circuitry for generating a first at least one data-signature and said second circuitry for generating a second at least one data-signature comprise circuitry for computing at least one error checking and correction (ECC) value.

2. The circuit of claim 1, wherein said at least one intervening stage of circuitry comprises a pipelined logic circuit stage.

3. The circuit of claim 1, wherein said first circuitry for generating said first at feast one data-signature and said second circuitry for generating said second at least one data-signature comprise circuitry for computing at least one parity bit.

4. The circuit of claim 1, wherein said at least one intervening circuit stage is further coupled with a second logic circuit stage.

5. The circuit of claim 1, wherein said circuitry for comparing said first at least one data-signature and said second at least one data-signature is coupled with an error-reporting circuitry so as to signal mismatches in said first at least one data-signature and said second at least one data-signature to said error-reporting circuitry.

6. The circuit of claim 1, wherein said at least one intervening stage of circuitry comprises at least one logic circuitry stage, at least one staging latch and at least one data-signature latch.

7. The circuit of claim 6, wherein said circuitry for comparing said first at least one data-signature and said second at least one date signature further comprises circuitry for correcting single bit errors in electronic signals contained in said at least one staging latch of said at least one intervening stage of circuitry.

8. A method of detecting errors in a circuit comprising:

generating a plurality of electronic signals;

computing a first at least one data-signature value based, at least in part, on said plurality of electronic signals;

staging said plurality of electronic signals and said first at least one data-signature value;

transmitting said staged plurality of electronic signals via at least one intervening stage of circuitry;

computing a second at least one data-signature value based, at least in part, on said plurality of electronic signals transmitted by said at least one intervening stage of circuitry; and comparing said first at least one data-signature value and said second at least one data-signature value, wherein said first at least one data-signature and said second at least one data-signature comprise error checking and correction (ECC) values.

9. The method of claim 8, further comprising transmitting an electronic message to an error-reporting circuit when said first at least one data-signature and said second at least one data-signature do not match.

10. The method of claim 8, wherein said first at least one data-signature and said second at least one data-signature comprise parity bits.

11. The method of claim 8, further comprising correcting one or more single bit errors in said plurality of electronic signals.

12. The method of claim 11, further comprising detecting one or more double bit errors in said plurality of electronic signals and reporting said one or more double bit errors to an error-reporting circuit.

13. A computing system comprising:

a memory system; and a processor comprising at least one datapath circuit, said at least one datapath circuit comprising a first stage of circuitry coupled with an intervening stage of circuitry, said intervening stage of circuitry being further coupled with a second stage of circuitry;

wherein said first and second stages of circuitry comprise circuitry for computing at least one data-signature and said second stage of circuitry further comprises circuitry for comparing a first at least one data-signature with a second at least one data-signature and signaling an error-reporting circuit if said first at least one data-signature and said second at least one data-signature do not match, and wherein said first and second stages of circuitry comprise circuitry for computing at least one error checking and correction (ECC) value.

14. The computing system of claim 13, wherein said memory subsystem comprises at least one memory component comprising at least one datapath circuit, said at least one datapath circuit comprising a first stage of circuitry coupled with an intervening stage of circuitry, said intervening stage of circuitry being further coupled with a second stage of circuitry;

wherein said first and second stages of circuitry comprise circuitry for computing at least one data-signature and said second stage of circuitry further comprises circuitry for comparing a first at least one data-signature with a second at least one data-signature and signaling an error-reporting circuit if said first at least one data-signature and said second at least one data-signature do not match.

15. The computing system of claim 14, wherein said intervening stages of circuitry of said processor and said at least one memory component comprise pipelining circuitry.

16. The computing system of claim 14, wherein said first at least one data-signatures and said second at least one data-signatures of said processor and said at least one memory component comprise parity bits.

17. The computing system of claim 14, wherein said first at least one data-signatures and said second at least one data-signatures of said processor and said at least one memory component comprise error checking and correction (ECC) values.

18. The method of claim 14, wherein said first at least one data-signature and said second at least one data-signature of said processor comprise parity bits; and said first at least one data-signature and said second at least one data-signature of said at least one memory component comprise error checking and correction (ECC) values.

* * * * *

UNITED STATES PATENT AND TRADEMARK OFFICE
CERTIFICATE OF CORRECTION

PATENT NO. : 6,711,712 B2
DATED : March 23, 2004
INVENTOR(S) : Quach

It is certified that error appears in the above-identified patent and that said Letters Patent is hereby corrected as shown below:

Column 7,
Line 36, delete "system" and insert -- subsystem --.

Signed and Sealed this

Twenty-fifth Day of May, 2004

JON W. DUDAS
*Acting Director of the United States Patent and Trademark Office*